Feb. 17, 1959

G. L. LARIMORE ET AL 2,873,991

LATCH

Filed Dec. 10, 1954

INVENTOR.
Galen L. Larimore
Benjamin H. Matthews
BY
Hyde, Meyer, Baldwin & Doran
ATTORNEYS Feb. 17, 1959

G. L. LARIMORE ET AL 2,873,991

LATCH

Filed Dec. 10, 1954

INVENTOR.
Galen L. Larimore
Benjamin H. Matthews
BY
Hyde, Meyer, Baldwin & Doran
ATTORNEYS United States Patent Office 2,873,991
Patented Feb. 17, 1959

2,873,991
LATCH

Galen L. Larimore, Cleveland, and Benjamin H. Matthews, Chagrin Falls, Ohio, assignors to The Langenau Mfg. Company, Cleveland, Ohio, a corporation of Ohio Application December 10, 1954, Serial No. 474,468

3 Claims. (Cl. 292—241)

My invention relates generally to hardware and more particularly to latches and the like.

An object of this invention is to provide a latch of as few parts as possible, while having a positive and secure locking action.

Another object is to provide a latch which is compact and will not require a substantial increase in the size of the lid or other member to which it is secured.

Another object of the present invention is to provide a latch characterized by its structural simplicity, the ease of assembly of its parts, its strong and sturdy nature and its low manufacturing cost. Other features of this invention reside in the arrangement and design of the parts for carrying out their appropriate functions.

Other objects and advantages of this invention will be apparent from the accompanying drawings and description and the essential features will be set forth in the appended claims.

Figure 1:
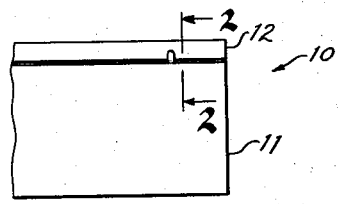
Fig. 1 is a front elevational view of the container and lid with the latch in a latched position.

Those familiar with the latch art will recognize that this invention may be applied in many ways. In the present application, it has been illustrated in connection with the walls and lid of a box or container.

With reference to Figs. 1 through 6, a metal container generally shown at 10 containing a main base portion 11 and a lid 12 having a hollow interior portion 12a is provided with my novel latching means. The lid 12 has an inwardly turned lip or edge portion 13 which provides an anchor plate for the latch. The lip 13 is provided with a circular aperture 13a spaced inwardly and adjacent the outer edge of the lid. A latch member 14 extends through the aperture 13a so as to depend from said lid.

The latch member is shown generally at 14. The main body of the latch consists of a generally elongated centering pin 15 of circular cross-section having an upper neck piece 16 of reduced diameter which extends through the aperture 13a. The lower portion of the centering pin has a diameter larger than the upper part and generally tapers toward its lower end. This enlarged portion is sharply defined by shoulders 17 which extend transversely to the longitudinal axis of the pin 15. The diameter of the lower portion of the centering pin is somewhat larger than that of the aperture 13a, so that its shoulders 17 abut the lower surface of lip 13 and limit the extent to which the pin may be moved upwardly. The upper neck portion 16 threadedly receives a nut 18. Said nut compressively retains a coil spring 19 which encircles the upper end of pin 15. It should be understood that any suitable spring retaining means may be used. The bottom coil of spring 19 rests on the inner surface of lip 13 since the spring is of greater diameter than aperture 13a. It will now be apparent that spring 19 exerts an upward thrust on nut 18 which in turn transmits the thrust to the pin 15 and thereby yieldingly constrains the pin in a position wherein shoulders 17 abut the lower surface of lip 13. The spring 19 produces friction between the pin 15 and lip 13 to yieldingly constrain the pin in any desired radial position while simultaneously permitting a limited amount of axial movement in the pin.

The enlarged lower portion of pin 15 is provided with a projection in the form of a bayonet catch or lug 20. The lug is positioned substantially intermediate the shoulders 17 and the lower distal end of the pin.

Figure 2:
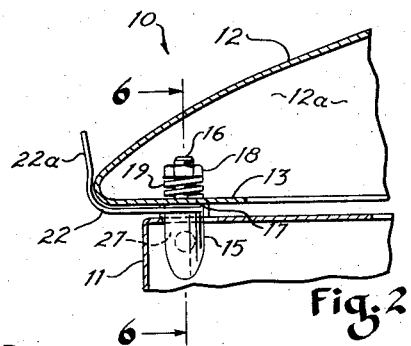
Fig. 2 is a fragmental cross-sectional view, enlarged, taken along the plane of line 2—2 of Fig. 1, showing the lid and base of a metal container with the latch in latching position.
Figure 3:
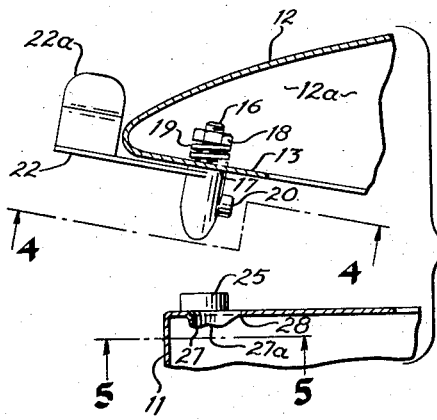
Fig. 3 is a fragmental cross-sectional view similar to Fig. 2, but showing the lid raised and the latch in an unlatched position.
Figure 4:
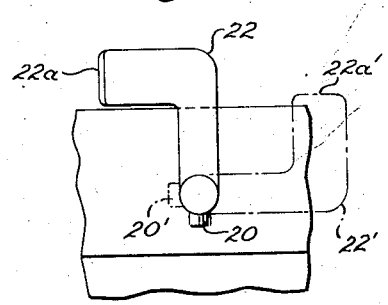
Fig. 4 is a plan view looking upwardly at the plane of line 4—4 of Fig. 3, showing the unlatched position of the latch in solid lines and the latching position in broken lines.
Figure 5:
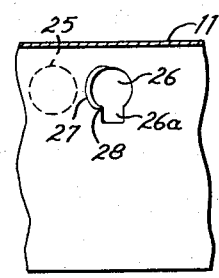
Fig. 5 is a sectional view of the latch taken along the plane of line 5—5 of Fig. 3.
Figure 6:
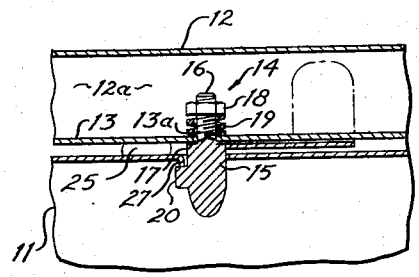
Fig. 6 is a fragmental cross sectional view taken along the plane of line 6—6 of Fig. 2, showing the latch in a latch engaging position constraining the lid to the base of the container.

A handle 22 for rotating the pin is attached at a point directly below the shoulders 17 and extends outwardly in a plane below the bottom surface of lip 13 and substantially parallel thereto, as best seen in Fig. 2. The handle has two angulated arms, the first of which extends outwardly to the outer edge of lid 12. The second arm is formed by bending the handle at an angle of 90 degrees so that it extends parallel to the outer edge of the lid 12, as seen in full lines in Fig. 4. The two arms are substantially of equal length, as seen in Fig. 4. The outer arm has an upturned end portion 22a which lies in a plane substantially parallel to the longitudinal axis of the first arm. It should be noted that the lug 20 extends in the opposite direction, but in radial alignment with the first arm, but in another plane. With reference to Fig. 4, it will be seen that the lug 20 can be rotated by handle 22 through an angle of 90 degrees from the full line position 20, 22, to that shown by the broken line position 20', 22'. The amount of rotation is limited by the upturned portion 22a of the handle 22. When in the full line position, the edge of said upturned portion abuts the edge of the lid 12 and limits its movement in a counterclockwise direction as viewed in Figs. 3 and 4. In the broken line position, the entire side or face portion of the upturned end 22a' of handle 22' abuts the edge of lid 12 and limits further clockwise rotation of lug 20'.

A clearance is maintained between the lid 12 and base 11 of the container by a spacer washer 25, positioned on the surface of the base at a zone adjacent the pin 15.

The base 11 or stationary part of the container is provided with a substantially circular aperture 26 which is aligned for entrance by the centering pin 15. The aperture 26 has a segment of its edge turned inwardly at 27, as seen in Figs. 2, 3, 5 and 6. This inwardly turned edge has an inclined or sloping surface, as best seen in Figs. 2 and 3. The aperture blank is further provided with a cut-out slot notch 26a which provides an opening through which lug 20 may enter. The cut-out 26a has an axis extending substantially perpendicular to the edge of lid 12 and lies on that portion of aperture 26 farthest away from the edge of lid 12. The sloping surface of inwardly turned edge 27 is inclined to intersect the edge of notch 26a and aperture 26 at a point 28 where they intersect each other. In other words, the flanged edge 27 increase in height from notch 26a around the edge of aperture 26.

The lid 12 is latched or locked to the stationary base 11 of the container by allowing the lid which is carrying the latch 14 to swing downwardly from the position shown in Fig. 3, wherein the latch handle 22 is positioned as shown in Fig. 3 and the full line position of Fig. 4, until the latch pin 15 extends into the aperture 26. The pin 15 has a tapered lower end 15a to facilitate locating the aperture 26 should the container be subject to slight distortional effects which would cause misalignment between the pin and aperture.

The lug 20 is positioned on pin 15 so that its uppermost edge will lie very close to, but just beneath the plane of aperture 26 at the time the lid 12 is brought down upon the base 11. As the handle 22 is rotated to the position shown in broken lines in Fig. 4, the lug is pivoted around and engages the inclined surface of the inturned edge or flange lip 27, which in turn causes the pin 15 to move downwardly and places the spring 19 under still more compression. With this movement of handle 22, pin 15 and lug 20 rotate through 90 degrees until the upturned end 22a of handle 22 abuts the edge of lid 12, whereupon the lug snaps into a slight recess 27a seen in Fig. 3 formed on the inclined surface of edge or lip 27. This fully closed position is seen in Fig. 2. The lug is retained in said recess under all normal circumstances by the upward thrust of spring 19, thereby locking the lid 12 to the stationary base 11. To release the lid from the stationary base, the handle 22 is turned counter-clockwise as viewed in Fig. 4 or from the broken line to the full line position, which disengages the lug from the lip 27 and returns it to a position of alignment with the cut-out 26a. The lid is thus released to be raised from its position on the base 11.

Figure 7:
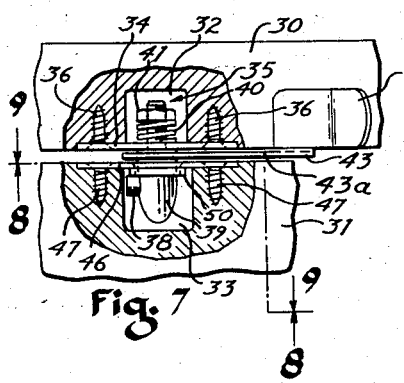
Fig. 7 is a cross sectional view of a modified form of my invention showing the novel latching means associated with a wooden container.
Figure 8:
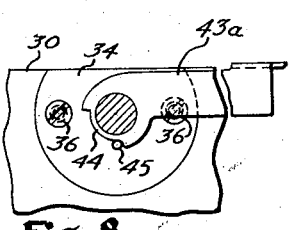
Fig. 8 is a plan view looking upwardly along the plane of line 8—8 of Fig. 7, showing the latch plate and latch arm.
Figure 9:
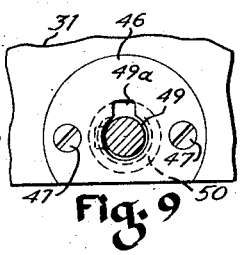
Fig. 9 is a plan view looking downwardly along the plane of line 9—9 of Fig. 7, showing the catch plate engaged by the latch member.

Modifications of the catch may be resorted to, as illustrated in Figs. 7, 8 and 9. Here the novel latch has been applied to a wooden container having a lid 30 and a stationary base 31. The lid 30 is provided with a recess 32 which is opposed by a recess 33 of similar size in the base 31. An anchor plate 34 retaining the novel latch member 35 is fastened to the lid over the recess 32 by means of screws 36 which extend through chamfered openings in a plate 34. The construction of the latch member 35 is identical to that heretofore described and includes the enlarged tapered end portion 39, spring 40 and retaining nut 41.

The construction of handle 43 is somewhat different from that previously described. Here the handle 43 is rigidly secured to the pin member 39 at a point just below the retainer plate 34, and comprises a straight arm 43a which extends outwardly beyond the edge of lid 30 and has an upturned end portion 43b which can be grasped by the fingers for manipulation. The extent to which the handle may be rotated is not controlled by the upturned end portion abutting the lid edge, as was the case previously, but rather, that portion of the handle which encircles the pin 39 is provided with an arcuate recess 44 which extends circumferentially approximately 90 degrees, as seen in Fig. 8. A pin 45 which depends from the retainer plate 34 limits the extent which the handle 43 may be rotated by abutting the end walls of recess 44. It will be noted that the arm 43a is so disposed with respect to the pin as to be beneath the lid 30 and have its outer edge parallel to and flush with the edge of lid 30 when in a latching position; so that only the upturned end 43b is exterior of the lid edge. A bayonet lug 38 on pin 39 is disposed parallel to the longitudinal axis of the arm 43a and is aligned with one of the end walls of recess 44.

The stationary base is provided with a catch shown in Fig. 7 and comprises a plate 46 which is fastened to the base by means of screws 47 which extend through chamfered openings in the plate. The plate 46 contains aperture 49 which is provided with a cut-out or notch 49a similar to 26a described above. However, the inturned flange edge 50 is here shown to extend about the entire circumference of the aperture 49 except with that portion intersected by the notch 49a. The inturned edge or lip 50 is inclined downwardly beginning at each side of the notch 49a at the point where it intersects the edge of aperture 49. The greatest depth of flange edge 50 occurs diametrically opposite notch 49a.

The operation of this modification is identical with that of the embodiment shown in Figs. 1 to 6, except for the handle 43 which has its pivotal movement defined by the recess 44 and pin 45.

A further modification of my novel catch is illustrated in Figs. 10 through 13. A metal container 55, similar to the container 10 shown in Figs. 1 to 6 is provided with modified handle and latch members. The latch member 57 identical to latch member 14 of Fig. 2, projects upwardly through the main base portion 58 and includes an elongated centering pin 59 having an enlarged tapered end portion 60, lug 60a, spring 61 and retaining nut 62. The lid 63 of the container 55 has an inwardly turned lip or edge portion 64 containing a substantially circular aperture 65 which is aligned for entrance by the centering pin 59. A segment of the annular edge portion of the aperture is turned inwardly as shown at 64a, see Figs. 10, 11 and 13. The aperture 65 is similar in all respects to aperture 26 contained in the embodiment shown in Figs. 1 through 6.

The latch member is provided with a handle having a construction different from those previously described. Here the handle is rigidly secured to the centering pin 59 at a point just above the horizontal base portion 58 and comprises a relatively straight arm 67a lying in a plane parallel to the horizontal base portion 58, and a vertically extending portion 67b which lies parallel and contiguous to the vertical outer face of the base portion 58 of the container 55 when the latch is in a latching position. The extent to which the handle 67 may be rotated is controlled by the vertical rearmost edge of the downwardly turned or vertically extending portion 67b abutting the front face of the base portion 58 when the latch has been rotated through an arc of rotation of approximately 90° to an unlatched position as shown in solid lines in Fig. 12. The handle 67 is so disposed with respect to the pin 59 as to lie beneath the lid 63 while its vertical portion 67b extends parallel and flush with the vertical edge of the base portion 58, when in a latching position; so that only the downwardly turned vertical portion 67b is exterior of the base portion 58. The outermost end of the downwardly turned portion of the handle is provided with an outwardly turned end portion for purposes of being grasped by the fingers for manipulation of the latch. The upper and lower surfaces of the horizontal or straight arm portions 67a of handle 67 are provided with upwardly and downwardly extending annular rims 69 and 70 respectively, which encircle pin 58 and provide means for spacing the handle 67 equal distances between the surfaces of the lid 63 and base 58. In addition, the annular rim portions 69 and 70 provide space between the lid and base.

Figure 10:
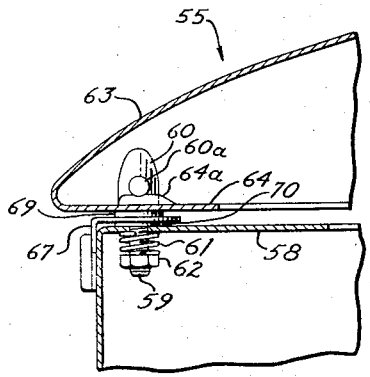
Fig. 10 is a fragmental cross sectional view, showing the lid and base of a sheet metal container with a modified form of latch in latching position.

Referring to Fig. 10, it will be seen that lid 63 overhangs the base portion 58 of the container and thereby completely removes from view the vertical extending portion 67b of handle 67 when in a latching position. Except for the novel construction and location of handle 67 and latching member 57 the operation of this modification is identical with that of the embodiment shown in Figs. 1 to 6.

Figures 14, 15, 16:
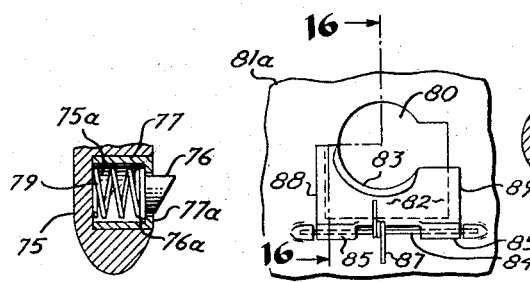
Fig. 14 is an enlarged fragmental cross sectional view of a modified centering pin having a retractable lug.
Fig. 15 is an enlarged fragmental view of a modified pin receiving aperture having a portion of its periphery pivotally mounted.
Fig. 16 is a cross sectional view taken along the plane of line 16—16 of Fig. 15 showing the pivoted periphery portion of the pin receiving aperture in both an open and closed position.

In Fig. 14 I have shown a modified construction for the centering pin. The pin 75 is shown provided with a retractable lug 76 for the purpose of preventing injury to the pin or the periphery of the pin receiving aperture should the lid accidentally be closed at a time when the lug is not in alignment with the cut-out of said aperture. It is apparent that under said circumstances the lug may strike the rigid edge of the pin receiving aperture with such force as to damage one or more of the parts involved. The lug 76 in Fig. 14 is so constructed as to retract within the pin 75 whenever it contacts an object which offers resistance. The centering pin 75 is provided with a bore 75a having a hollow sleeve 77 securely fastened therein, said sleeve having an inwardly directed rim portion 77a at its outer end. The retractable lug is provided with an enlarged flanged end 76a which abuts against the inner surface of the rim portion 77a and prevents the lug from being accidentally removed from the bore 75a. A coil spring 79 is compressibly positioned between the inner end of bore 75a and the inner end of lug 76 to yieldingly urge the the lug to an outwardly projecting position as viewed in Fig. 14. The outer end of the lug 76 is beveled to facilitate a smooth retracting action when the lug strikes a rigid object.

Figure 11:
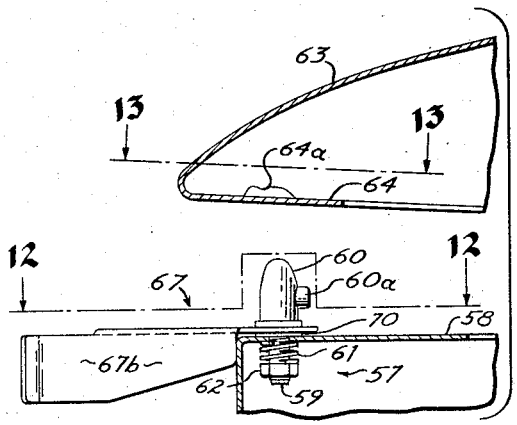
Fig. 11 is a fragmental cross sectional view similar to Fig. 10, showing the lid raised and the latch in an unlatched position.
Figure 12:
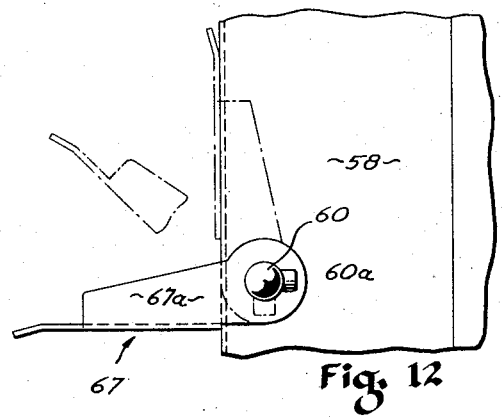
Fig. 12 is a fragmental plan view looking downwardly at the plane of line 12—12 of Fig. 11, showing the unlatched position of the latch in solid lines and the latching position in broken lines.
Figure 13:
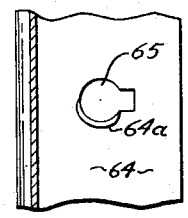
Fig. 13 is a sectional view of the latch taken along the plane of line 13—13 of Fig. 11.

Another useful construction for preventing damage under the above described condition is shown in Figs. 15 and 16. Here a portion of the lid 81 forms a keeper plate having a latch-pin-receiving opening 80 therethrough and having a lug-receiving notch at one side of said aperture as clearly seen in Fig. 15. That portion of the peripheral edge of the pin receiving aperture 80 which is traversed by lug 60a during its operative travel of approximately 90 degrees is provided in a pivotal gate member 82. One side 83 of the gate 82 forms this portion of the peripheral edge of aperture 80, while another side 84 of the gate is fastened by hinge connections 85 to the inner surface of the turned in lid portion 81a, as seen in Fig. 16. A coil spring 87 is secured to the hinge connection in such a way as to normally urge the gate 82 into a closed position, as shown by the full line position of Fig. 16. In the closed position the plane of the gate 82 is in alignment with that of the lid portion 81a, to form a portion of the periphery of aperture 80, as viewed in Fig. 15. It is now apparent that should a centering pin, provided with a rigid lug, as shown in Figs. 11 and 12, strike the peripheral edge of aperture 80, the gate 82 would merely swing to its open position, shown by the dot-dash position in Fig. 16, thereby preventing injury to any of the involved parts. The gate 82 is constructed to swing only upwardly, as viewed in Fig. 16, since its end edges 88 and 89 rest upon the inner surface of the lid portion 81a. It is only necessary to provide a pivotal gate over that portion of the peripheral edge of the pin receiving aperture 80 as is traveled by the lug of the pin. As viewed in Fig. 12, the lug 60a is limited by handle 22 and may rotate only through 90°; thus, it would be sufficient that only one-quarter, or the 90° covered by the rotation of lug 60a be hinged as here described.

It should be understood that I do not wish to limit the various modifications to any particular embodiment of my invention, but rather they may be freely interchanged and substituted in any practical manner.

In view of the foregoing description, taken in conjunction with the accompanying drawings, it is believed that a clear understanding of the construction, operation and advantages of the device will be quite apparent to those skilled in this art.

It is to be understood, however, that even though there is herein shown and described preferred embodiments of the invention, the same is susceptible to certain changes fully comprehended by the spirit of the invention.

What is claimed is:

1. Means for latching a cover member to a box member including a latch pin mounted in one of said members for limited axial movement and having a nose extending away from said one member and into the other of said members, spring means operatively associated with said pin and yieldingly urging it axially in one direction, a flat lever fixed to said pin and lying between said members when said cover member closes said box member with the flat dimension of said lever generally parallel to the registering surfaces of said members there, a lug projecting radially outwardly from the nose of said pin, a keeper plate on the other of said members and there being an aperture in said plate complementary to the cross-section of said pin at the zone of said lug, there being a notch in said plate not substantially wider than said lug, and said lug and notch and lever being so positioned that said lug registers with said notch when said lever extends outwardly at an angle to the edge of said cover member, and said lug lies beyond said plate in latched position and out of registration with said notch when said lever lies closely parallel to the edge of said cover member, said lever in said last named position closely conforming to the edge of said cover member there so as to be inconspicuous.

2. Latching means as in claim 1 wherein that portion of said keeper plate containing the peripheral edge of said aperture traversed by said lug is constructed as a separate portion and is hingedly connected to said other member to swing away from said plate in the direction of latching movement of said pin into and through said aperture, whereby to prevent injury to the parts if said cover member is closed with said lug out of registration with said notch.

3. Latching means as in claim 1 where said lug is mounted for limited radial movement in said pin, spring means in said pin yieldingly holding said pin radially outwardly, and coacting surfaces on the outer end of said pin and said plate edge about said aperture for camming said lug radially inwardly if said lug hits the edge of said aperture when closing said cover member.

References Cited in the file of this patent

UNITED STATES PATENTS

| | | |
|---|---|---|
| 272,333 | Sargent | Feb. 13, 1883 |
| 384,181 | Torbeck | June 5, 1888 |
| 395,513 | Powers | Jan. 1, 1889 |
| 534,987 | Alsdorf | Mar. 5, 1895 |
| 1,541,093 | Amico | June 9, 1925 |
| 1,604,977 | Crone | Nov. 2, 1926 |
| 1,621,624 | Campo | Mar. 22, 1927 |
| 2,187,426 | Kuhnel | Jan. 16, 1940 |
| 2,595,485 | Roman | May 6, 1952 |
| 2,684,516 | Zahodiakin | July 27, 1954 |

FOREIGN PATENTS

| | | |
|---|---|---|
| 9,130 | Austria | Sept. 10, 1902 |
| 570,305 | Germany | Feb. 14, 1933 |